US009146785B2

(12) United States Patent
Tillier et al.

(10) Patent No.: US 9,146,785 B2
(45) Date of Patent: Sep. 29, 2015

(54) APPLICATION ACCELERATION IN A VIRTUALIZED ENVIRONMENT

(75) Inventors: Fabian Samuel Tillier, Portland, OR (US); Thomas Fahrig, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/232,266

(22) Filed: Sep. 14, 2011

(65) Prior Publication Data

US 2013/0067468 A1 Mar. 14, 2013

(51) Int. Cl.
G06F 9/455 (2006.01)
G06F 9/50 (2006.01)
G06F 9/54 (2006.01)
G06F 9/44 (2006.01)

(52) U.S. Cl.
CPC .......... *G06F 9/5077* (2013.01); *G06F 9/45541* (2013.01); *G06F 9/545* (2013.01); *G06F 9/4411* (2013.01)

(58) Field of Classification Search
None
See application file for complete search history.

(56) References Cited

U.S. PATENT DOCUMENTS

| | | | |
|---|---|---|---|
| 5,910,180 A | 6/1999 | Flory | |
| 6,393,495 B1 | 5/2002 | Flory | |
| 7,793,307 B2 | 9/2010 | Gokhale | |
| 7,900,017 B2 * | 3/2011 | Hall et al. | 711/207 |
| 7,954,150 B2 | 5/2011 | Croft et al. | |
| 2005/0132365 A1 | 6/2005 | Madukkarumukumana et al. | |
| 2005/0246453 A1 * | 11/2005 | Erlingsson et al. | 710/1 |
| 2006/0146057 A1 * | 7/2006 | Blythe | 345/506 |
| 2006/0161719 A1 | 7/2006 | Bennett et al. | |
| 2007/0028244 A1 | 2/2007 | Landis | |
| 2008/0294808 A1 | 11/2008 | Mahalingam et al. | |
| 2009/0006868 A1 * | 1/2009 | Alkove et al. | 713/193 |

(Continued)

FOREIGN PATENT DOCUMENTS

| | | |
|---|---|---|
| CN | 1797345 A | 7/2006 |
| CN | 1831790 A | 9/2006 |

OTHER PUBLICATIONS

LaVasseur, J. et al., "Pre-virtualization: Slashing the cost of virtualization,"—Published Nov. 2005, Proceedings: Technical Report 2005-30, Fakultat fur, Informatik, Universitat Karlsruhe (TH).

(Continued)

*Primary Examiner* — Camquy Truong
*Assistant Examiner* — Mehran Kamran
(74) *Attorney, Agent, or Firm* — Ben Tabor; Stein Dolan; Micky Minhas

(57) ABSTRACT

One embodiment illustrated herein includes a method that may be practiced in a computing environment. The method includes acts for providing direct access to hardware to virtual machines. The method includes determining that a virtual machine should have access to a piece of hardware. The method further includes a virtual machine requesting access to the hardware from the host wherein a host is a special partition that controls the physical hardware of a computing system and manages virtual machines. The method further includes the host configuring the hardware to allow access to the hardware directly by the virtual machine by the host mapping hardware resources into the virtual machine's address space. The method further includes the virtual machine directly accessing the hardware without going through the host once the hardware has been configured by the host.

16 Claims, 4 Drawing Sheets

(56) References Cited

U.S. PATENT DOCUMENTS

| | | |
|---|---|---|
| 2009/0044187 A1* | 2/2009 | Smith et al. .................. 718/1 |
| 2009/0164990 A1* | 6/2009 | Ben-Yehuda et al. ............ 718/1 |
| 2009/0313406 A1 | 12/2009 | Suh |
| 2009/0328074 A1 | 12/2009 | Oshins |
| 2010/0082851 A1* | 4/2010 | Green et al. .................. 710/29 |
| 2010/0125679 A1* | 5/2010 | Tang et al. .................. 710/8 |
| 2010/0138840 A1* | 6/2010 | Kagan et al. .................. 718/104 |
| 2011/0154378 A1 | 6/2011 | Kishan |
| 2011/0173371 A1* | 7/2011 | Karamcheti et al. ............. 711/6 |
| 2011/0296440 A1* | 12/2011 | Laurich et al. ................ 719/326 |
| 2012/0030676 A1* | 2/2012 | Smith et al. .................. 718/1 |
| 2012/0151483 A1* | 6/2012 | Belay .......................... 718/1 |
| 2012/0290766 A1* | 11/2012 | Oshins ......................... 711/6 |
| 2012/0304171 A1* | 11/2012 | Joshi et al. .................. 718/1 |

OTHER PUBLICATIONS

LaVasseur, J. et al., "Pre-virtualization: soft layering for virtual machines," Published Aug. 4, 2008 Proceedings: Computer Systems Architecture Conference, 2008. ACSAC 2008. 13th Asia-Pacific.

"First Office Action and Search Report Received for Chinese Patent Application No. 201210339548.X", Mailed Date: Oct. 10, 2014, 19 Pages.

"Second Office Action Issued in Chinese Patent Application No. 201210339548.X", Mailed Date: Jun. 10, 2015, 13 Pages.

"Search Report Issued in European Patent Application No. 12832494.4", Mailed Date: Jul. 3, 2015, 8 pages.

* cited by examiner

APPLICATION ACCELERATION IN A VIRTUALIZED ENVIRONMENT

BACKGROUND

Background and Relevant Art

Computers and computing systems have affected nearly every aspect of modern living. Computers are generally involved in work, recreation, healthcare, transportation, entertainment, household management, etc.

Many computing systems have sufficient hardware and resources to allow the computing systems to perform multiple functions at the same time or in a fashion that appears as if the functions are being performed at the same time. Such computing systems may be said to have multi-threads, where each thread performs a task. In some environments, virtual machines may be implemented. Virtual environments leverage actual hardware resources to implement virtual machines that appear to software and hardware as actual hardware machines.

In some scenarios, hardware device access in a virtualized environment requires virtualizing hardware devices and using a virtual device to marshal requests to the real hardware device. In particular, a virtual machine interfaces with real hardware by communicating with a virtual hardware device which, routes messages to a hardware machine, which then communicates with the real hardware device (such as a network card, storage device, video card, sound card, etc.). Virtual devices implemented in this fashion can be inefficient and provide lackluster performance as they do not have any underlying hardware, but rather rely on tight cooperation between the virtual machine and the host operating system.

In other scenarios, virtualization-aware hardware devices and associated software infrastructure allow the hardware device and its drivers to operate in a virtual machine. These specialized virtualization-aware hardware devices are specially installed such that to convert and existing system may require replacement of legacy hardware devices to virtualization-aware devices. Full hardware virtualization requires complicated hardware and software drivers and infrastructure The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for providing direct access to hardware to virtual machines. The method includes determining that a virtual machine should have access to a piece of hardware. The method further includes a virtual machine requesting access to the hardware from the host wherein a host is a special partition that controls the physical hardware of a computing system and manages virtual machines. The method further includes the host configuring the hardware to allow access to the hardware directly by the virtual machine by the host mapping hardware resources into the virtual machine's address space. The method further includes the virtual machine directly accessing the hardware without going through the host once the hardware has been configured by the host.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein may allows devices that naturally provide multi-user access to reach the same level, or nearly the same level, of I/O performance in a virtualized environment as when running in a non-virtualized environment. In some embodiments, this may be done by virtualizing drivers and APIs allowing virtual machines to directly interact with hardware devices, rather than virtualizing hardware devices. This may allow native, or near native, I/O performance when virtual machines interact directly with actual hardware as opposed to where virtual machine hardware interactions are intercepted and sent to a real machine for interaction with the actual hardware. Further, embodiments can be implemented with hardware that is not virtualization-aware. Embodiments may also allow existing hardware to provide new I/O devices to virtual machines without the need to change other hardware components such as IOMMU (input/output memory management unit) or SR-IOV (single root input/output virtualization). Just adding a new I\O card will be sufficient to expose the same I\O functionality to the hosted virtual machines. The resulting performance may exceed what can be reached by emulating the device.

Figure 1:
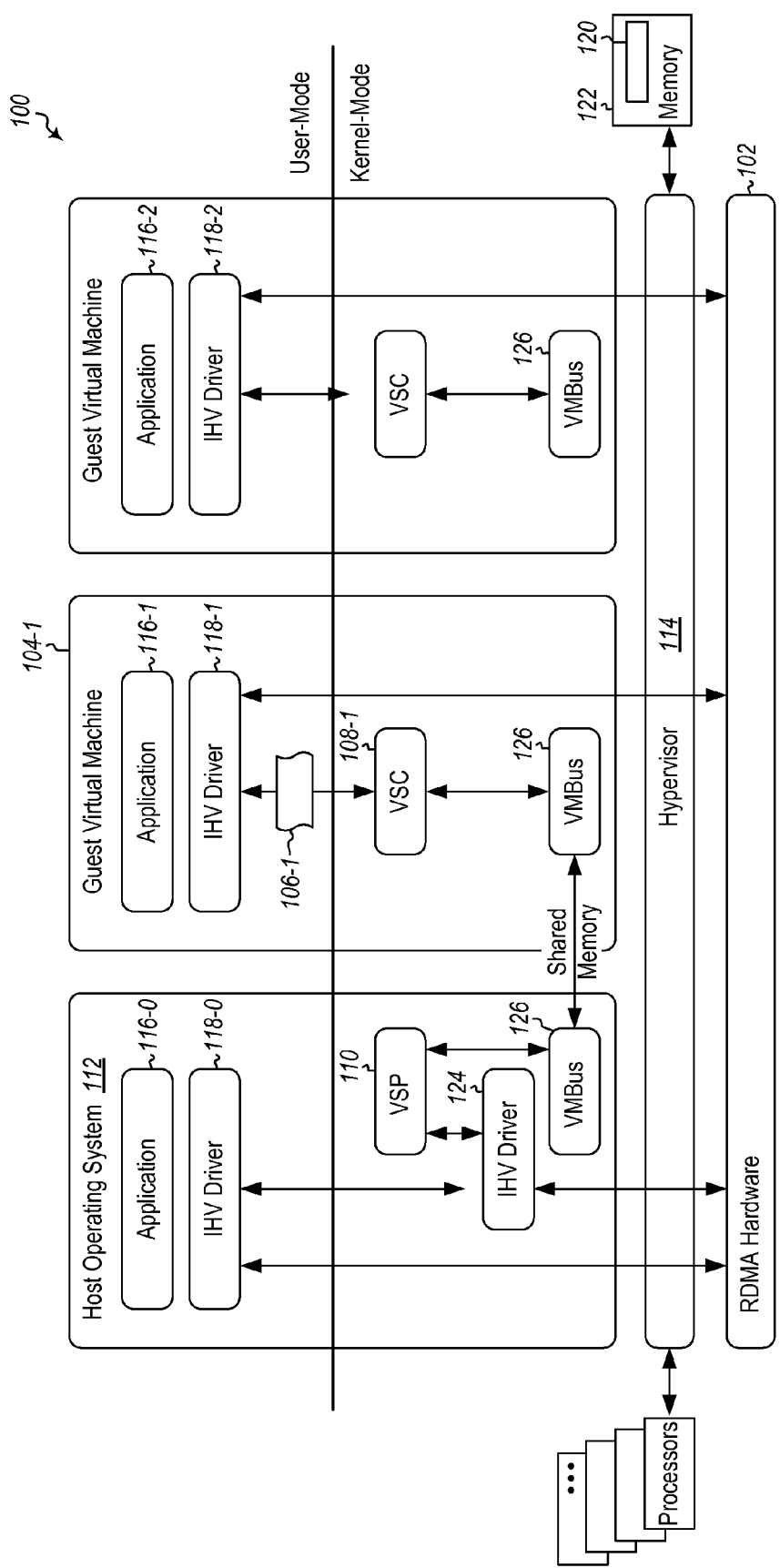
FIG. 1 illustrates a computing environment including a host and a number of virtual machines.

As intimated above, embodiments may allow software components in a virtual machine to access physical hardware devices as if they were physically accessible in that virtual machine. In some embodiments, this may be accomplished using remote direct memory access (RDMA) hardware 102, which facilitates direct memory access from the memory of one computer into that of another without involving either one's operating system. Referring now to FIG. 1, an example is illustrated. FIG. 1 illustrates in a first virtual machine 104-1 that an input/output control (IOCTL) request 106-1 from user-mode library 118-1 piece to the kernel-mode device driver (such as device driver 124) is intercepted and processed by a virtual service client 108-1 in the virtual machine 104-1, in cooperation with a virtual service provider 110 running in the host 112 and communicating through a hypervisor 114 and a shared virtual machine bus 126.

By virtualizing a device driver API (e.g. IOCTL interfaces), a device's functionality can be mapped into a virtual machine without requiring virtualization support at the hardware device (e.g. RDMA hardware 102). The benefits in bandwidth, latency, CPU utilization, and jitter allow greater scalability of computing and I/O workloads in a virtual environment such as cloud computing, enabling workloads such as high performance computing.

In the example illustrated in FIG. 1, InfiniBand RDMA network hardware 102 is made accessible in a virtual machine environment 100 to applications, such as applications 116-0, 116-1, and 116-2 (referred to herein generically as 116). RDMA hardware 102 normally provides applications 116 with the capability to perform I/O operations without the involvement of the operating system. RDMA-aware applications allocate and setup hardware resources (such as RDMA hardware 102) by making requests to the RDMA hardware drivers, such as drivers 118-0, 118-1, and 118-2 (which may be referred to herein generically as 118). These hardware resources provide means for initiating I/O operations and detecting their completions directly from the application's address space 120 in system memory 122, by mapping hardware resources such as registers into the application address space 120 and/or mapping application memory into the hardware 102 such that the hardware 102 can read and/or write to that memory. These memory buffers and device registers form the basis of communication between the application 116 and device hardware 102 so that at runtime kernel transitions are unnecessary. The device drivers 118 for such devices involve both a kernel-mode driver 124 that runs in the operating system, as well as user-mode libraries 118-0, 118-1 and 118-2 that implement an IOCTL interface to the kernel drivers (e.g. driver 124) for allocating and configuring device resources. The hardware device (e.g. the RDMA hardware 102) maintains and enforces application separation and security, preventing one application 116 from adversely affecting another's resources and memory.

RDMA hardware 102 natively allows multiple distinct applications concurrent access. Some embodiments treat applications 116 running in a virtual machine 104 the same as those running in a non-virtualized operating system. The IOCTL interface traditionally used by the driver components running in the application's address space 120 are virtualized so that those driver components work in the virtualized environment with no modification, as if they were interfacing to the hardware 102 directly. By providing the relevant memory mapping functionality to map both hardware resources into a virtual machine 104 as well as virtual machine application memory into the hardware 102 for DMA access, embodiments allow for software running in the virtual machine 104, both applications 116 running in user-mode, as well as operating system components running in kernel-mode, to access the hardware 102 directly, treated as any other application from the perspective of the hardware 102.

As noted previously, in traditional hardware virtualization solutions, I/O port accesses are emulated causing additional communication taking place between a virtual machine and a host, where the host remains fully in control of device hardware. Alternatively, the hardware has to translate from a guest physical address to host physical address (e.g. SRIOV). In contrast, some embodiments described herein abstract the API layer so that the hardware 102 remains fully in control of the root operating system, without needing to translate guest virtual machine addresses. Some embodiments can be used with hardware that does not include any virtualization awareness, rather, virtualization can be implemented entirely in software without the hardware 102 needing to know that virtual machines 104 are accessing the hardware 102.

Figure 2:
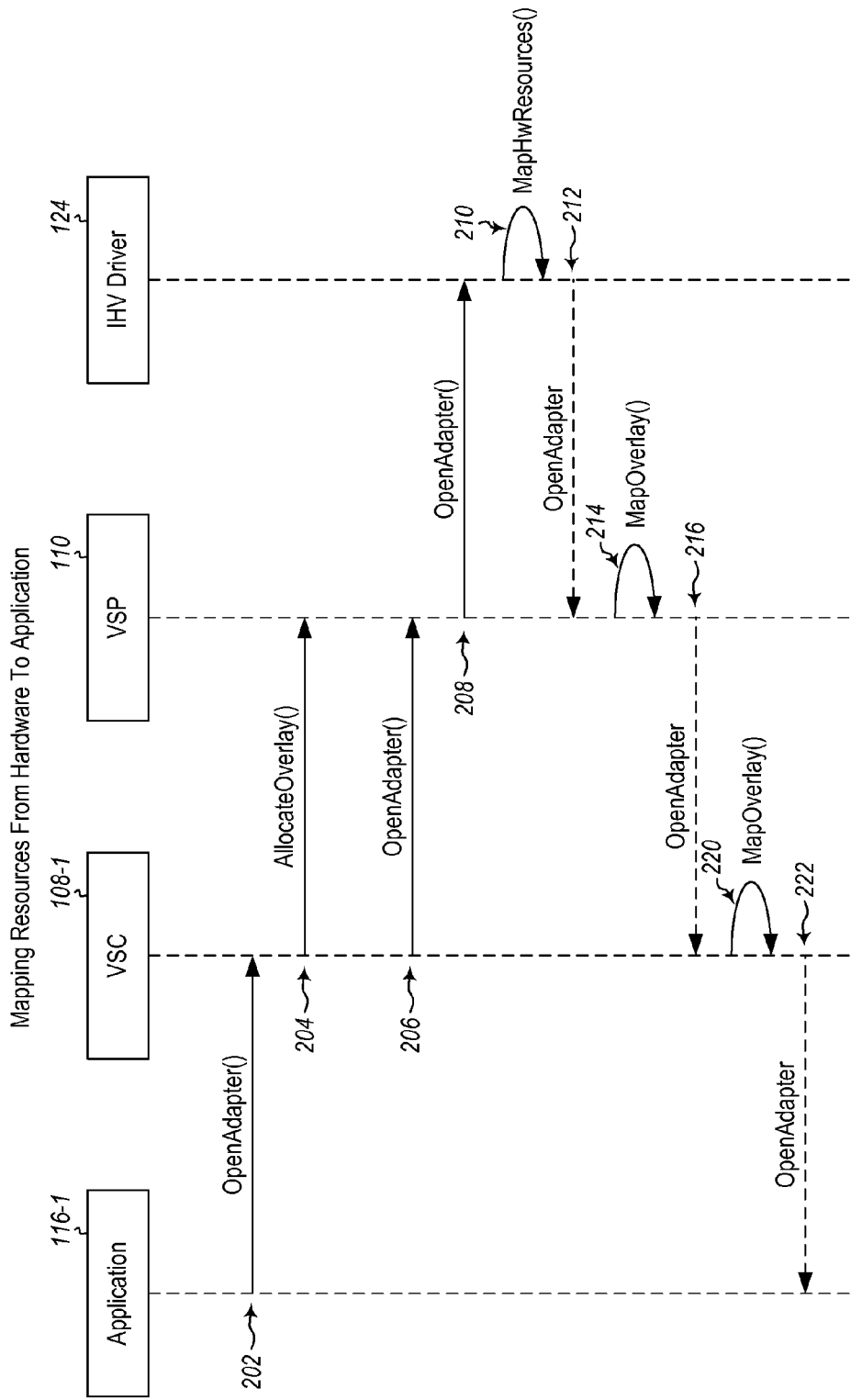
FIG. 2 illustrates mapping resources from hardware to an application.
Figure 3:
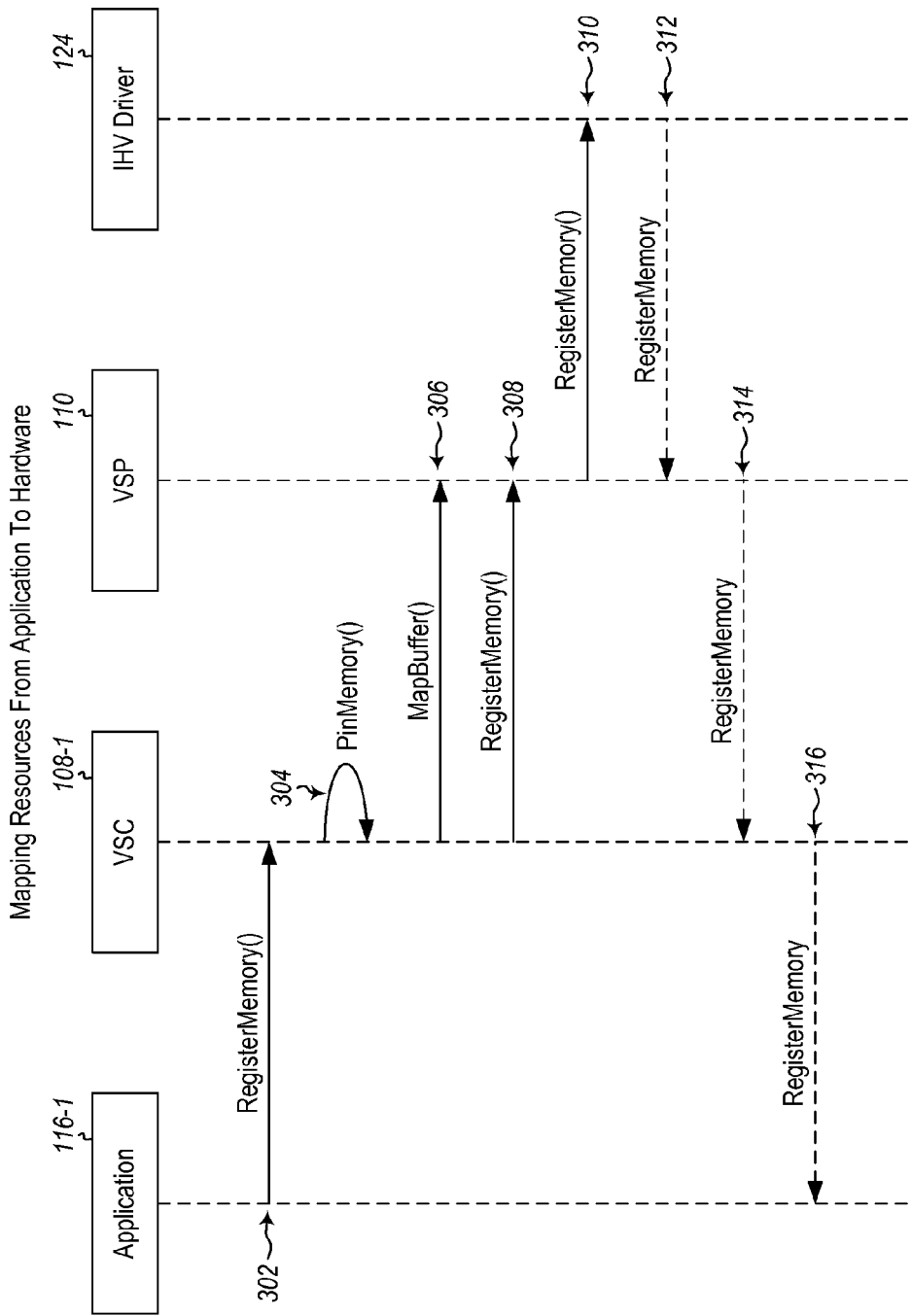
FIG. 3 illustrates mapping resources from an application to hardware.

As discussed above, hardware resources can be mapped from hardware to application address space and application memory can be mapped to hardware. FIGS. 2 and 3 illustrate examples of these mappings.

In particular, FIG. 2 illustrates mapping resources from hardware to application address space. In particular, at 202, FIG. 2 illustrates an application 116-1 sending a request directed to a driver 124 to open an adapter to the hardware 102 (FIG. 1). The request is intercepted by the virtual service client 108-1.

As illustrated at 204, the virtual service client 108-1 sends a request to the virtual service provider 110 requesting an overlay to be allocated. Allocating the overlay, for example, provides the virtual machine 104-1 with on offset into real memory so as to map virtual memory into real memory. At 204, a guest address to which the virtual service provider 110 can map host address is pre-allocated. Further, as illustrated at 206, the virtual service client 108-1 sends along the request to open that adapter to the virtual service provider 110. As illustrated at 208, the virtual service provider passes along the request to open the adapter to the IHV (independent hardware vendor) driver 124.

As illustrated at 210, the driver 124 maps hardware resources to memory, and in particular to a host address. At 212, the driver 124 provides an acknowledgement to the request to open the adapter to the virtual service provider 110.

At 214, the virtual service provider 110 creates an overlay map. The overlay map maps real memory and virtual machine memory. The mapping is of the hardware resources as illustrated at 210 to the overlay allocated by the virtual service client illustrated at 110. In particular, the host address is mapped to the guest address. The host 112 controls all memory 122, but allocates a portion of the memory 122 to virtual machines 104. The virtual service provider 110 can communicate with the virtual service consumers 108 using the VMBus 126. Thus, in the illustrated example, the virtual service provider 110 can create the mapping between virtual machine memory address space and physical memory 122 (and/or device register space), and communicate this to the virtual machines using the VMBus 126 as illustrated in FIG. 1.

Returning once again to FIG. 2, at 216, the open adaptor acknowledgement is sent from the virtual service provider 110 to the virtual service consumer 108-1. The virtual service consumer 108-1 also now sets up an appropriate map overlay into an application's address space. In particular, at 220 the guest address is mapped into the application's address space. At 222, the open adaptor acknowledgement is returned to the application 116-1. At this point, the application 116-1 is able to communicate with hardware 102 without needing the communication to first go through the host 112. Rather, the driver 118-1 can use the memory map for the virtual machine 104-1 to communicate directly with the hardware 102, by communicating directly with physical memory.

Referring now to FIG. 3, an example of mapping resources from and application to hardware is illustrated. At 302, and application 116-1 sends a request to a driver 124 to register memory for use with the application. The request to register memory is intercepted by a virtual service consumer 108-1. As illustrated at 304, the virtual service consumer 108-1 pins memory in the virtual machine for the application 116-1.

At 306, the virtual service client sends a message to the virtual service provider 110 indicating a mapping of a buffer for the memory for the application. Further, as illustrated at 308, the virtual service client 108-1 forwards the request to register memory to the virtual service provider 110.

As illustrated at 310, the virtual service provider forwards the register memory to the driver 124. At 312, the driver 312 acknowledges the request to register memory. At 314, the virtual service provider 110 forwards the acknowledgement to the virtual service consumer 108-1. At 316, the virtual service consumer forwards the acknowledgement to the application 116-1.

While the example above illustrates virtualization using RDMA hardware, similar API virtualization can be applied to other technologies. For example some embodiments may virtualize general purpose graphics processing units (GPGPU) used as floating-point co-processors in high-performance computing applications to make GPGPU resource available to applications running in a virtualized environment without requiring hardware modifications. In particular, the input and output buffers for GPGPU computing are mapped to real memory such that the GPU can access it and operate with it. This in essence also virtualizes a GPGPU at the API layer by providing near native performance while the host is in full control of the hardware and policy setting of its devices.

GPGPU-aware applications typically load program logic (GPU-specific code) for the mathematical operations they wish to perform, as well as the data on which these operations are performed. APIs are traditionally used to perform these operations, and these APIs can be virtualized by providing buffer mappings in some embodiments, allowing the GPGPU in the host to execute the program logic specified by the user on the data specified by the user.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
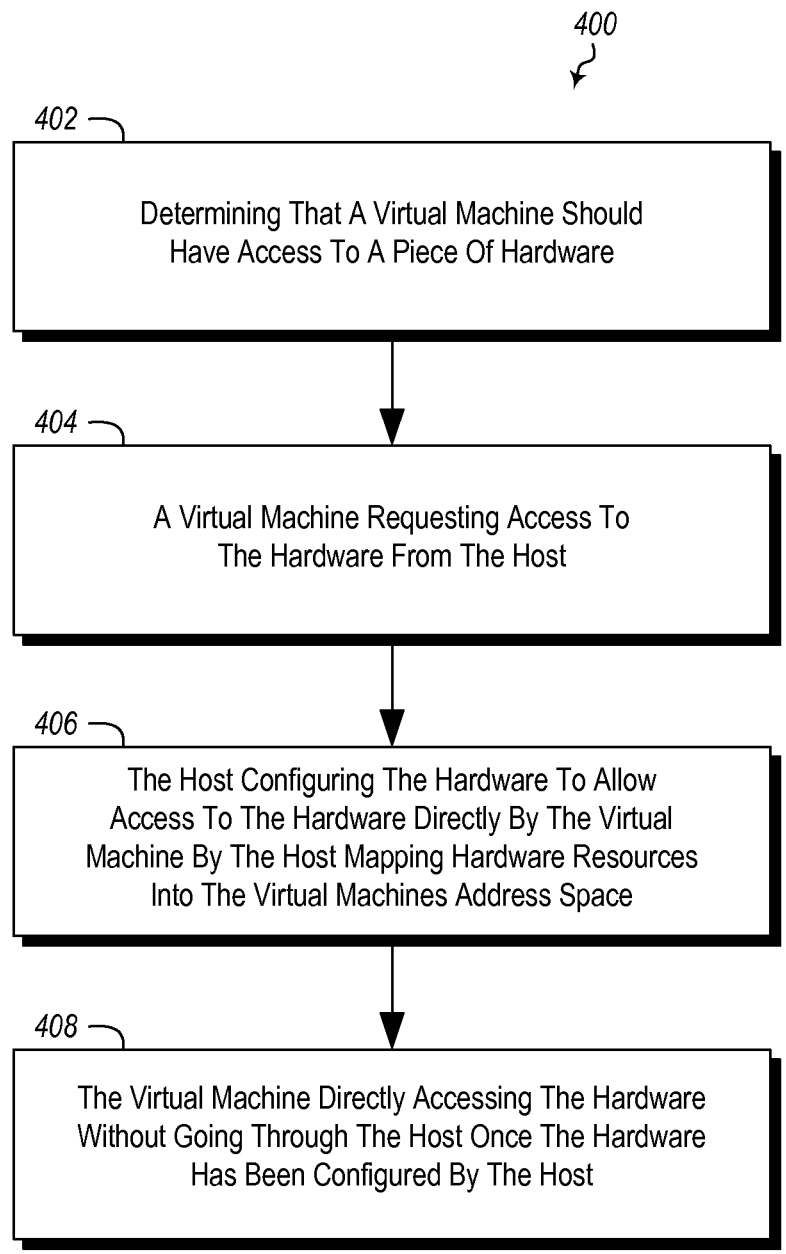
FIG. 4 illustrates a method of providing direct access to hardware to virtual machines.

Referring now to FIG. 4, a method 400 is illustrated. The method 400 may be practiced in a computing environment, and includes acts for providing direct access to hardware to virtual machines. This may be done for virtualizing at the higher API level rather than the device level. This can simplify policy enforcements while providing near native performance. The method 400 includes determining that a virtual machine should have access to a piece of hardware (act 402).

The method 400 further includes a virtual machine requesting access to the hardware from the host wherein a host is a special partition that controls the physical hardware of a computing system and manages virtual machines (act 404)

The method 400 further includes the host configuring the hardware to allow access to the hardware directly by the virtual machine by the host mapping hardware resources into the virtual machine's address space (act 406).

The method 400 further includes the virtual machine directly accessing the hardware without going through the host once the hardware has been configured by the host (act 408).

The method 400 may be practiced where mapping hardware resources into the virtual machine's address space comprises mapping into the address space of an application running on the virtual machine. Application in this context may include one or more traditional applications running in user-mode in a virtual machine. Alternatively or additionally, an application in this context may include one or more kernel-mode drivers running in the virtual machine.

The method 400 may be practiced where determining that a virtual machine should have access to a piece of hardware comprises the host allowing access based on policy controlled by the host.

In some embodiment, configuring the hardware to allow access is based on the host applying a policy. For example, the policy may include quality of service rules. Alternatively or additionally, the policy may include access checks. Alternatively or additionally, the policy may enforce partitions. Since the host still has full access to the hardware it can dictate the policy of what services are provided to the virtual machines. It can do quality of service, access checks, bandwidth control, partitioning at a much finer granularity than for instance SR-IOV.

From a networking perspective, embodiments may allow the host to filter connection requests to prevent virtual machines from gaining access to other machines to which they should not have access. By filtering access at connection establishment time, full I/O performance is preserved without the need for actual network partitioning (VLANs, etc.) or network traffic filtering. Likewise, the host can enforce particular network traffic priorities independent of virtual machine involvement.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of providing direct access to hardware to virtual machines, the method comprising:

a virtual machine executing at a computer system determining to grant the virtual machine access to particular physical input/output hardware at the computer system;

the virtual machine sending a request to access the particular physical input/output hardware to a host partition at the computer system, wherein the host partition controls one or more pieces of physical hardware of the computing system and manages virtual machines executing at the computing system, and wherein the host partition and the virtual machines execute on top of a fabric controller at the computing system;

subsequent to receiving the request to access to the particular physical input/output hardware, a component at the host partition configuring the computing system to allow access to the physical input/output hardware directly by the virtual machine, including the component at the host partition allocating an overlay for the virtual machine that maps hardware memory resources of the physical input/output hardware into an address space of the virtual machine, wherein the mapping is based on, in part, applying a policy that includes one or more of an access check and an enforcement of a partition; and the virtual machine directly accessing the particular physical input/output hardware without going through the host partition once the computing system has been configured to allow access to the physical input/output hardware directly by the virtual machine.

2. The method of claim 1, wherein the component at the host partition configuring the computing system to allow access to the physical input/output hardware directly by the virtual machine comprises the component mapping an address space of an application running on the virtual machine into hardware memory resources.

3. The method of claim 1, wherein the policy is controlled by the host partition.

4. The method of claim 1, wherein the policy also includes one or more quality of service rules.

5. The method of claim 1, wherein the virtual machine executing at the computer system determining to grant the virtual machine access to the particular physical input/output hardware at the computer system comprises an application executing at the virtual machine determining to grant the application access to the particular physical input/output hardware at the computer system, and wherein the virtual machine sending the request to access the particular physical input/output hardware to the host partition at the computer system comprises a first driver at the virtual machine intercepting the request which was sent from the application and forwarding the request to the component at the host partition.

6. The method of claim 1, wherein the component at the host partition configures the computing system to allow access to the physical input/output hardware directly by a plurality of virtual machines, including the component at the host partition allocating an overlay for each virtual machine that maps hardware memory resources to an address space of each virtual machine, and wherein the physical input/output hardware manages separation between the plurality of virtual machines.

7. The method of claim 1, wherein the component at the host partition allocating an overlay for the virtual machine that maps hardware memory resources of the physical input/output hardware into an address space of the virtual machine, includes the component mapping at least one register of the physical input/output hardware into the address space of the virtual machine.

8. One or more hardware storage devices having stored thereon computer executable instructions that, when executed by one or more processors of a computer system, causes the following to be performed by the computer system:
- a virtual machine executing at a computer system determining to grant the virtual machine access to particular physical input/output hardware at the computer system;
- the virtual machine sending a request to access the particular physical input/output hardware to a host partition at the computer system, wherein the host partition controls one or more pieces of physical hardware of the computing system and manages virtual machines executing at the computing system, and wherein the host partition and the virtual machines execute on top of a fabric controller at the computing system;
- subsequent to receiving the request to access to the particular physical input/output hardware, a component at the host partition configuring the computing system to allow access to the physical input/output hardware directly by the virtual machine, including the component at the host partition allocating an overlay for the virtual machine that maps hardware memory resources of the physical input/output hardware into an address space of the virtual machine, wherein the mapping is based on, in part, applying a policy that includes one or more of an access check and an enforcement of a partition; and
- the virtual machine directly accessing the particular physical input/output hardware without going through the host partition once the computing system has been configured to allow access to the physical input/output hardware directly by the virtual machine.

9. The computer readable medium of claim 8, wherein the component at the host partition configuring the computing system to allow access to the physical input/output hardware directly by the virtual machine comprises the component mapping an address space of an application running on the virtual machine into hardware memory resources.

10. The computer readable medium of claim 8, wherein the policy is controlled by the host partition.

11. The computer readable medium of claim 8, wherein the policy also includes one or more quality of service rules.

12. The computer readable medium of claim 8, wherein the component at the host partition allocating an overlay for the virtual machine that maps hardware memory resources of the physical input/output hardware into an address space of the virtual machine, includes the component mapping at least one register of the physical input/output hardware into the address space of the virtual machine.

13. A computing system, the computing system comprising:
- one or more processors; and
- a computer readable memory coupled to the one or more processors, wherein the computer readable memory comprises computer executable instructions that when executed by the one or more processors causes the following to be performed:
- a virtual machine executing at the computer system determining to want the virtual machine is allowed to have access to particular physical input/output hardware at the computer system;
- the virtual machine sending a request to access the particular physical input/output hardware to a host partition at the computer system, wherein the host partition that controls one or more pieces of physical hardware of the computing system and manages virtual machines executing at the computing system, and wherein the host partition and the virtual machines execute on top of a fabric controller at the computing system;
- subsequent to receiving the request to access to the particular physical input/output hardware, a component at the host partition configuring the computing system to allow access to the physical input/output hardware directly by the virtual machine, including the component at the host partition allocating an overlay for the virtual machine that maps hardware memory resources of the physical input/output hardware into an address space of the virtual machine, wherein the mapping is based on, in part, applying a policy that includes one or more of an access check and an enforcement of a partition; and
- the virtual machine directly accessing the particular physical input/output hardware without going through the host partition once the computing system has been configured to allow access to the physical input/output hardware directly by the virtual machine.

14. The computer system of claim 13, wherein the component at the host partition configuring the computing system to allow access to the physical input/output hardware directly by the virtual machine comprises the component mapping an address space of an application running on the virtual machine into hardware memory resources.

15. The computer system of claim 13, wherein the policy is controlled by the host partition.

16. The computer system of claim 13, wherein the component at the host partition allocating an overlay for the virtual machine that maps hardware memory resources of the physical input/output hardware into an address space of the virtual machine, includes the component mapping at least one register of the physical input/output hardware into the address space of the virtual machine.

* * * * *